June 28, 1966   J. PAYMAL   3,258,352
METHOD FOR PRODUCING IN A GLASS ARTICLE STRESSES
HETEROGENEOUSLY DISTRIBUTED
Filed Jan. 9, 1961
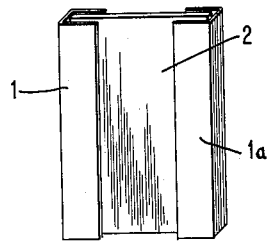
Fig. 1
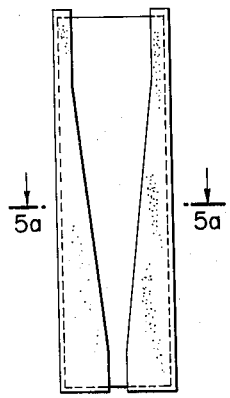
Fig. 5
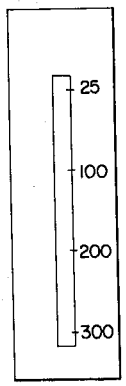
Fig. 6
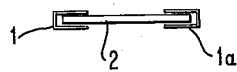
Fig. 2
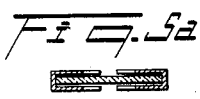
Fig. 5a
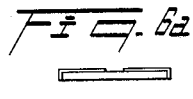
Fig. 6a
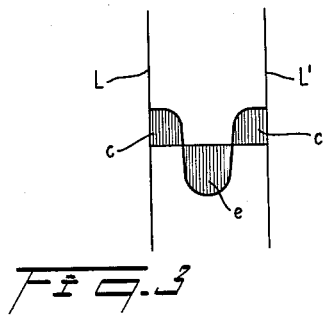
Fig. 3
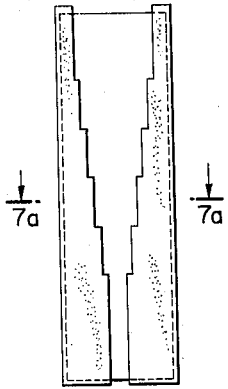
Fig. 7
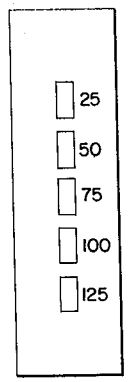
Fig. 8
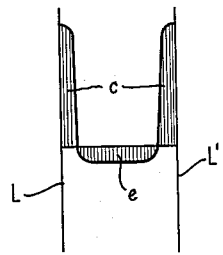
Fig. 4
Fig. 7a   Fig. 8a
INVENTOR
JEAN PAYMAL
BY Bauer and Seymour
ATTORNEYS United States Patent Office 3,258,352
Patented June 28, 1966

3,258,352
METHOD FOR PRODUCING IN A GLASS ARTICLE STRESSES HETEROGENEOUSLY DISTRIBUTED
Jean Paymal, Neuilly-sur-Seine, France, assignor to Compagnie de Saint-Gobain, Neuilly-sur-Seine, France
Filed Jan. 9, 1961, Ser. No. 81,483
Claims priority, application France, Jan. 8, 1960, 815,144
11 Claims. (Cl. 106—54)

The present invention relates to a method for producing in a silicate glass article stresses distributed heterogeneously.

According to this method, the glass article is subjected to a corpuscular bombardment by means of radiations such as neutrons, protons, etc., while protecting some portion of the glass body with a screen which partially or entirely absorbs the radiation.

If the object to be treated is made of silicate glass of which the density increases under corpuscular bombardment, that is to say, a body which contracts under the action of such irradiation, the portions of the body irradiated are put under tension while the portions protected by the screen are put under compression.

Such glasses have the following molecular composition:

$SiO_2$—comprised between 50 and 99%
$Al_2O_3$—comprised between 0 and 20%
$B_2O_3$—comprised between 0 and 50%
$Li_2O+Na_2O+K_2O$—comprised between 0 and 20%
$MgO+CaO+SrO+BaO$—comprised between 0 and 30%
$PbO$—comprised between 0 and 20% with the conditions:

$SiO_2+B_2O_3+Al_2O_3$—greater than 75%
$M_2O+MO+PbO$—comprised between 0 and 25%
$B_2O_3$—greater than 1% or $Li_2O$—greater than 10%

$M_2$ represents the alkaline metals
M represents the earth alkaline metals.

Inversely, if the object is constituted by a glass which expands under the action of such radiation, compression stressses are produced in the exposed portions while the portions protected by the screen are put under tension.

Such glasses have the following molecular composition:

$SiO_2$—comprised between 10 and 70%
$Al_2O_3$—comprised between 0 and 20%
$B_2O_3$—comprised between 0 and 50%
$Li_2O+Na_2O+K_2O$—comprised between 0 and 30%
$MgO+CaO+SrO+BaO$—comprised between 0 and 30%
$PbO$—comprised between 0 and 85% with the conditions:

$SiO_2+B_2O_3+Al_2O_3$—lower than 70%
$M_2O+MO+PbO$—greater than 15%
$B_2O_3$—greater than 1% or $Li_2O$—greater than 10%

M and $M_2$ have the same meanings as indicated above.

The method may be used for a great number of different applications as it is easily capable of numerous modifications or variations. The screen may have any desired shape. It is possible to choose a screen thick enough to absorb the radiation entirely or a screen which permits the passage of a part of the radiation. In particular, a screen of graduated thickness can be used in order to obtain a gradual variation of the action of irradiation from a portion directly exposed, to a portion completely protected by the interposition of the screen.

According to one embodiment of the present invention there can be used, in particular, a thermal neutron flux similar to that obtained in atomic piles. In that case, the screen may advantageously be constituted by a sheet of cadmium or by any material containing an element having a great absorption cross-section, as boron —10, lithium —6 and gadolinium —159.

The invention has considerable interest because it permits the very simple production of compression stresses on the edges of treated objects, giving a better mechanical strength to said objects. The tension stresses which balance said compression stresses may be very light, if proper relations are selected between the exposed and protected portions, as indicated by the following examples which will be described with reference to the accompanying drawings wherein:

FIG. 1 is a view in elevation and in perspective of one form of embodiment of the invention.

FIG. 2 is an end view of the embodiment of FIG. 1.

In both figures the small glass sheet to be treated is provided with the screens.

FIG. 3 is a graphical representation of a particular form of the stress distribution in the treated product.

FIG. 4 shows a graphical representation of another form of the stress distribution.

FIG. 5 represents in elevation another form of embodiment of invention with a form of screen, utilized for the production of a birefringence gauge.

FIG. 6 is an elevation of a continuous birefringence gauge obtained with the screen of FIG. 6.

FIG. 7 gives in elevation a form of embodiment which will produce a graduated birefringence gauge.

FIG. 8 is an elevational view of a graduated birefringence gauge.

*Example 1*

The article which was treated according to the method of the invention was a rectangular small glass plate of 15 x 50 x 1 mm. The glass had the following composition by weight:

$SiO_2$, 75.6; $B_2O_3$, 15.1; $Al_2O_3$, 2.3; CaO, 0.4; MgO, 0.3; $Na_2O$, 4.2; $K_2O$, 1.7

Two marginal bands of said small plate, selected along the two long sides of the plate, were covered, on both faces as shown in FIGS. 1 and 2, with screens 1–1a constituted by sheets of cadmium of a thickness of 0.4 mm. and a width of 3.75 mm. The total area of the portions covered by the screen was the same as the exposed area 2. The whole was submitted to a neutron flux of $10^{12}$ $n/cm.^2/sec.$ at a temperature of 70 to 80° C. The irradiation dose was of $3.10^{17}$ $n/cm.^2$.

The plate was thereafter examined and shown to have acquired stresses the distribution of which is graphically represented in relation to the distance from the longitudinal edges LL' by a curve of a shape similar to that indicated on FIG. 3. The compression stresses c and the tension stresses e are practically equal and have a mean value of 1000 m$\mu$/cm. which, by taking into account the photo-elasticity constant of the irradiated plate, corresponds to about 270 kg./cm.$^2$.

*Example 2*

The process used is the same as for Example 1 but the screens had a width of 1.5 mm. only. The distribution of the stresses which were obtained in this case is indicated in FIGURE 4, the compression stresses at the edges having a mean value of 3.900 m$\mu$/cm., that is about 1000 kg./cm.$^2$, while the tension in the central part has for mean value only 720 m$\mu$/cm.$^2$, that is 200 kg./cm.$^2$.

*Example 3*

A disc made of the same glass as in the preceding examples, having a diameter of 21 mm. and a thickness of 1.3 mm. with its edges protected by a ring made of cadmium having a width of 3 mm. and a thickness of 0.4 mm. was irradiated in the same manner as in the preceding examples. After irradiation, the edges exhibited a mean

Example 4

The small glass plate utilized in the present case had dimensions of 36 x 20 x 0.5 mm. and the following composition:

| | Parts by weight |
|---|---|
| $SiO_2$ | 40 |
| $B_2O_3$ | 20 |
| PbO | 30 |
| $Li_2O$ | 10 | compression of 2500 m$\mu$./cm. that is about 700 kg./cm.$^2$.

On the two faces of said plate were placed, in its middle portion, parallel to its length, a sheet of cadmium of 0.4 mm. thickness and 10 mm. width. The plate, covered by the screen was submitted to an irradiation by thermal neutrons corresponding to a total dose of $8.7 \times 10^{17}$ n/cm.$^2$ with an intensity equal to that utilized in the preceding examples.

The sheet acquired, in its marginal portion, that is in the portion not protected by the screen, compression stresses having a mean value of 435 m$\mu$./cm., that is about 275 kg./cm$^2$, while tension stresses having a mean value of 630 m$\mu$./cm., that is about 325 kg./cm.$^2$, were acquired in the middle portion.

It is possible, according to the process of the invention, to establish in a glass sheet, between two zones, a barrier to the propagation of fragmentation from one zone to the other, in case of breakage occurring in one of said zones. If the glass utilized expands under the action of irradiation, the portion to be irradiated is that which must constitute the barrier to propagation of fragmentation, while the remainder of the glass sheet will be protected by a screen. If the glass utilized contracts under the action of irradiation, the only portion to be protected by the screen is the portion which must constitute the barrier to propagation of fragmentation.

When submitting tempered glass to the treatment according to the present invention, the initial stresses created by the tempering operation would be modified under the action of said treatment.

The cited examples considered only the simple case of a glass article in the form of a small plate or of a disc. But it must be understood that the invention may be applied to all glass articles regardless of their shape, with a screen embodying all the geometrical forms, enabling the operator to produce any desired stress distribution system. As a result, the invention may be successfully applied to the treatment of the edges of glass objects such as tumblers, dinner plates, necks of bottles, etc. . . .

Among other examples of articles which can be obtained by the process according to the present invention may be cited birefringence gauges.

Example 5

The birefringence gauge is utilized to estimate the difference of optical paths in articles undergoing stresses. Generally, said gauges are constituted by sheets of plastic material hardened under stress or by sheets cut in birefringent crystals. The first named gauges have the drawback of being unstable, the second are expensive. It is possible to produce such gauges by irradiating glass sheets partially protected by absorbing screen of desired shape and thickness.

It is, for example, possible to utilize a small rectangular sheet of boron-containing glass of 2 x 7 x 0.1 cm., and to cover the two long sides with a cadmium sheet 0.05 cm. thick cut so as to leave on the sheet an exposed trapezoidal zone, as shown in FIGURE 5. The cadmium bands covering both faces may be independent and are maintained in position by any convenient means. It is also possible to fold a cadmium band of appropriate width and thickness so as to cover each edge on both faces. FIGURE 5a represents an embodiment with folded sheets.

At the ends, the uncovered surface of FIG. 5 is of 10 mm. toward the great base and 5 mm. toward the little base.

In irradiating the glass sheet, partially protected by the indicated screens, by a flux of $0.7 \times 10^{12}$ n/cm.$^2$ during 80 hours at a temperature of the order of about 80 to 120° C., it is possible to obtain a glass sheet exhibiting along its axis a birefringence which varies from one end to the other. The glass utilized contracting under irradiation, the irradiated zone is put under tension. The marginal portions exhibit some birefringence due to compression stresses which balance the tension stresses of the middle zone. Some time after irradiation, about a week, the radioactivity induced in the glass has practically vanished and it is possible to utilize the sheet as a birefringence gauge. To this end, it is possible to cover the marginal areas with an opaque frame and to mark the birefringence with gradations scribed on the edge of the frame (FIGURE 6).

It is also possible to construct a frame with slots sufficiently narrow to enable one to assume that the birefringence in each slot is constant (FIGURE 8). According to an improvement, the sheet is produced with a birefringence which varies by steps, by the utilization of stepped screens (FIGURE 7). In this case, the gauge presents homogeneous birefringences in each slot, which may range from 25 to 125 m$\mu$ for example (FIGURE 8).

In any case, the gauging of the birefringence may be made once for all instruments if the irradiating conditions are the same for all the gauges produced. Under the conditions given for the continuous gauge, the birefringences obtained have values varying continuously from 25 to 300 m$\mu$.

It is also possible to obtain such gauges by the utilization of marginal screens of constant width but of decreasing thickness along its length, in order to afford graded interruption of the neutronic radiation and thus to produce a differential exposure of the glass. The differential effect on the unprotected areas and the covered areas produces a varying birefringence similar to those obtained with a screen of trapezoidal form and constant thickness.

It is obvious that it is possible to modify the shape and the thickness of the screens in order to obtain a variation of the birefringence according to any desired law from one end to the other of the gauge.

Although only a limited number of embodiments of the invention have been illustrated in the accompanying drawings and described in the foregoing specification, it is to be especially understood that various changes, such as in the relative dimensions of the parts, materials used and the like as well as the suggested manner of application of the invention may be made therein without departing from the spirit and scope of the invention as will be now apparent to those skilled in the art.

What is claimed is:

1. A process to induce in a silicate glass article stresses varying laterally from one zone to another of its breadth, which comprises exposing a first part of the glass article to corpuscular radiation while excluding a second part of the article, which is laterally disposed with respect to the first part, from equivalent exposure.

2. A process according to claim 1, in which the article is made of a glass which contracts under corpuscular irradiation, thereby putting the portions of the glass article most exposed to the radiations under tension and the less exposed portions under compression.

3. A process according to claim 1, in which the article is made of a glass which expands under corpuscular irradiation, thereby putting the portions of the glass article most exposed to the radiations under compression and the protected portions under tension.

4. A process according to claim 1, in which the corpuscular radiations are thermal neutrons.

5. A process according to claim 1, in which a shield is used, constituted by a material containing an element having a great absorption cross-section selected from the group consisting of cadmium, boron, lithium and gadolinium, and containing said element in sufficient amount to act as a shield.

6. A process according to claim 1 in which the glass utilized has the following molar composition:

$SiO_2$—comprised between 50 and 99%
$Al_2O_3$—comprised between 0 and 20%
$B_2O_3$—comprised between 0 and 50%
$Li_2O+Na_2O+K_2$—comprised between 0 and 20%
$MgO+CaO+SrO+BaO$—comprised between 0 and 30%
$PbO$—comprised between 0 and 20% with the conditions:

$SiO_2+B_2O_3+Al_2O_3$—greater than 75%
$M_2O+MO+PbO$—comprised between 0 and 25%
$B_2O_3$—greater than 1%
$M_2$—being the alkaline metals
M—representing the alkaline earth metals.

7. A process according to claim 1 in which the glass utilized has the following molecular composition:

$SiO_2$—comprised between 50 and 99%
$Al_2O_3$—comprised between 0 and 20%
$B_2O_3$—comprised between 0 and 50%
$Li_2O+Na_2O+K_2$—comprised between 0 and 20%
$MgO+CaO+SrO+BaO$—comprised between 0 and 30%
$PbO$—comprised between 0 and 20% with the conditions:

$SiO_2+B_2O_3+Al_2O_3$—greater than 75%
$M_2O+MO+PbO$—comprised between 0 and 25%
$Li_2O$—greater than 10%
$M_2$—being the alkaline metals
M—representing the alkaline earth metals.

8. A process according to claim 3 in which the glass utilized has the following molecular composition:

$SiO_2$—comprised between 10 and 70%
$Al_2O_3$—comprised between 0 and 20%
$B_2O_3$—comprised between 0 and 50%
$Li_2O+Na_2O+K_2O$—comprised between 0 and 30%
$MgO+CaO+SrO+BaO$—comprised between 0 and 30%
$PbO$—comprised between 0 and 85% with the conditions:

$SiO_2+B_2O_3+Al_2O_3$—inferior to 70%
$M_2O+MO+PbO$—greater than 15%
$B_2O_3$—greater than 1%
$M_2$—being the alkaline metals
M—representing the alkaline earth metals.

9. A process according to claim 3 to put in compression the portions of the glass article exposed to radiations and in extension the covered portions, in which the glass utilized has the following molecular composition:

$SiO_2$—comprised between 10 and 70%
$Al_2O_3$—comprised between 0 and 20%
$B_2O_3$—comprised between 0 and 50%
$Li_2O+Na_2O+K_2O$—comprised between 0 and 30%
$MgO+CaO+SrO+BaO$—comprised between 0 and 30%
$PbO$—comprised between 0 and 85% with the conditions:

$SiO_2+B_2O_3+Al_2O_3$—inferior to 70%
$M_2O+MO+PbO$—greater than 15%
$Li_2O$—greater than 10%
$M_2$—being the alkaline metals
M—representing the alkaline earth metals.

10. A method of making a glass article having a zone capable of interrupting the fragmentation of the glass which comprises irradiating a barrier zone with corpuscular radiation until the zone is under compression stresses.

11. A method of stressing silicate glass which comprises subjecting a limited part of a glass object to bombardment with heavy particle corpuscular radiation while excluding adjacent parts, which are laterally disposed with respect to said limited part, from equivalent exposure thereto, thereby establishing opposed stresses in the glass.

References Cited by the Examiner

UNITED STATES PATENTS

| | | | |
|---|---|---|---|
| 2,746,193 | 5/1956 | Billian | 41—41 X |
| 2,998,675 | 9/1961 | Olcott et al. | 106—39 |
| 3,065,345 | 11/1962 | Le Clerc | 250—83.1 |
| 3,107,196 | 10/1963 | Cloque | 65—115 |
| 3,113,009 | 12/1963 | Brown et al. | 106—39 |

OTHER REFERENCES

Ceramic Bulletin, volume 36, No. 9 (1957), "Radiation Effects on Ceramics," pages 372–374.

Nucleonics, volume 14, No. 7, July 1956, "What Are Effects of Radiation on Electronic Components," pages 33–35.

TOBIAS E. LEVOW, *Primary Examiner.*

ARTHUR P. KENT, *Examiner.*

D. H. SYLVESTER, H. McCARTHY,
*Assistant Examiners.*